United States Patent [19]
Mason

[11] 3,968,763
[45] July 13, 1976

[54] RAMMED AIR CUSHION HYDROPLANE

[76] Inventor: John S. Mason, 105 Deepdene Road, Baltimore, Md. 21210

[22] Filed: Feb. 28, 1974

[21] Appl. No.: 446,670

[52] U.S. Cl. ............................................. 114/67 A
[51] Int. Cl.² ......................................... B63B 1/34
[58] Field of Search ............ 114/63, 66.5 R, 66.5 F, 114/66.5 H, 66.5 P, 66.5 S, 67 R, 67 A; 9/6

[56] References Cited
UNITED STATES PATENTS

| | | | |
|---|---|---|---|
| 1,637,677 | 8/1927 | Bonnemaison | 114/66.5 S |
| 1,656,411 | 1/1928 | Baldwin | 114/67 A |
| 2,495,588 | 1/1950 | Mason | 114/66.5 R |
| 3,547,064 | 12/1970 | Glass | 114/66.5 S |
| 3,661,109 | 5/1972 | Weiland | 114/66.5 R |
| 3,773,006 | 11/1973 | Black | 114/66.5 S |
| 3,808,998 | 5/1974 | Molotzak | 114/66.5 R |

*Primary Examiner*—George E. A. Halvosa
*Assistant Examiner*—Jesus D. Sotelo

[57] ABSTRACT

Improvements in hydroplane boats in which a unique combination of diagonal and transverse planing surfaces provides stability and makes the boat safe to operate at high speeds and at the same time forms an air cavity under the center of gravity of the boat which is pressurized by air scoops and regulated by various devices to support the boat on an air cushion and improve its high speed efficiency without decreasing its stability in any mode of operation.

4 Claims, 4 Drawing Figures

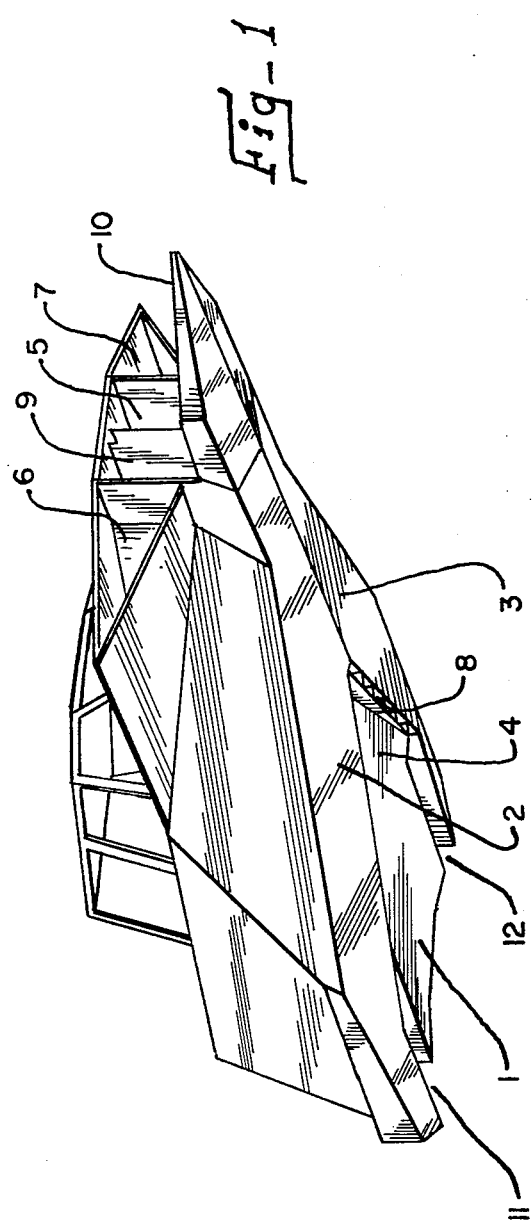
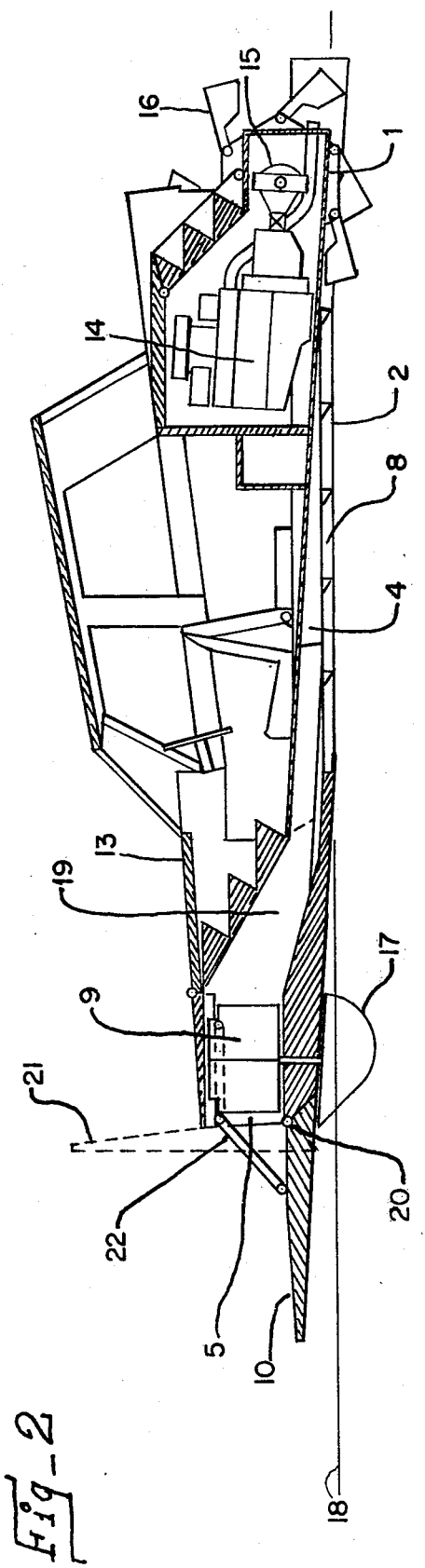

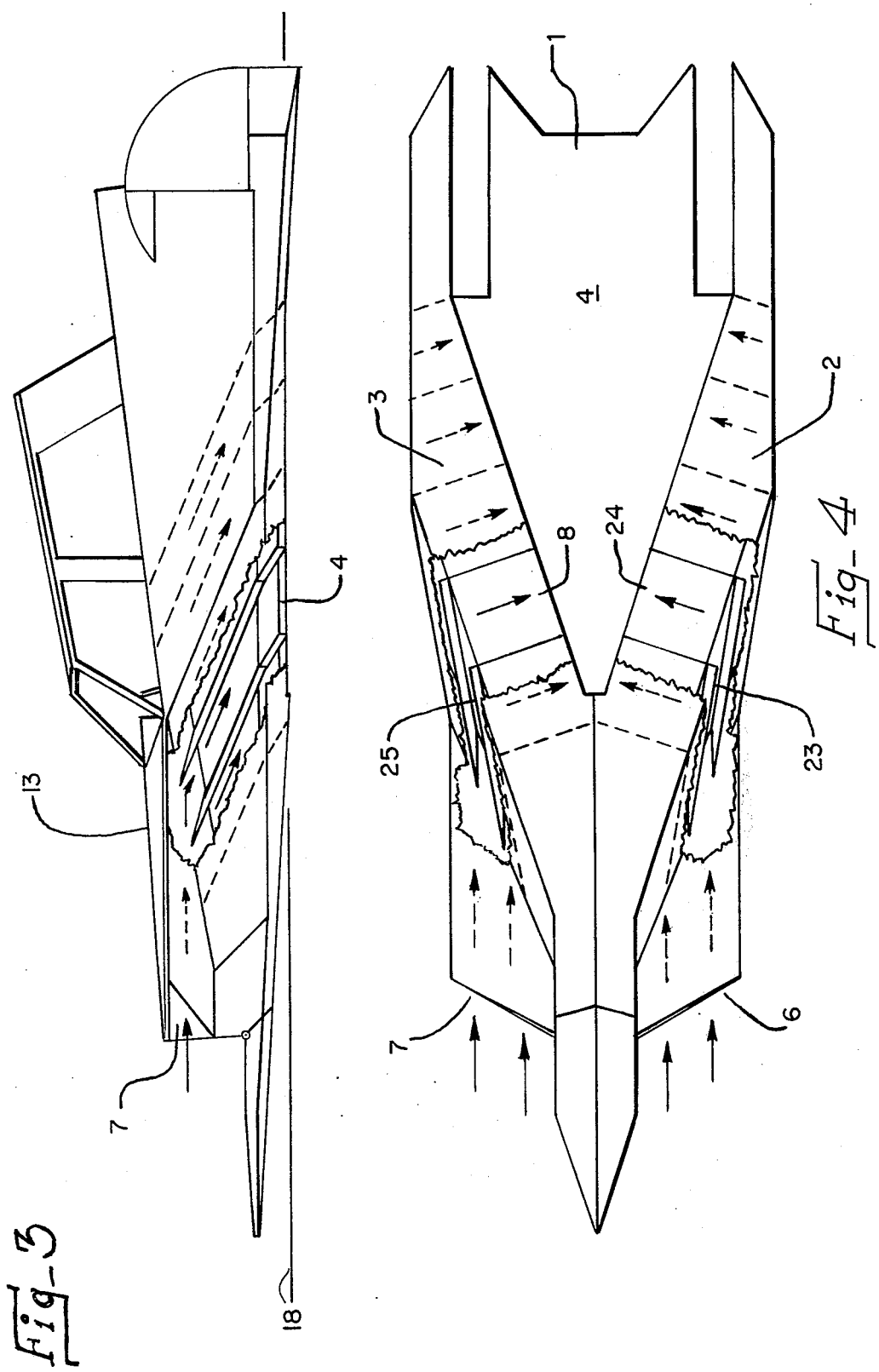

RAMMED AIR CUSHION HYDROPLANE

Ref:
U.S. Pat. No. 2,495,588 Mason 1/24/50
U.S. Pat. No. 3,773,434 Mason 11/20/73

OBJECT OF THE INVENTION

Hydroplane boats have proven to be the most efficient type of high speed boats, but all present types have also proven to be basically unstable and unsafe to operate. Hydroplanes with flat transverse planes forward and aft porpoise in choppy water or leap out of the water and pound heavily back into it. In quartering waves or in a turn they trip as they pound into the water and flip over sideways. Hydroplanes with planing sponsons on either side of the bow generally don't porpoise, but in quartering waves they tramp or pound from side to side and trip and flip over sideways. When they are built with broad flat bows which entrap air and form an air cushion under the boat, they sometimes catch a gust of wind under the bow and flip over backwards. Hydroplanes with deep vee bottoms and the center of gravity well aft are much more stable in turns. Because of the aft center of gravity they pound into the water stern first and are less likely to flip over, but they leap and pound so badly that the crew has to wear protective padding, and they are not nearly as fast as the flat bottom types. All of these faults in hydroplanes arise from their propensity to leap out of the water which results from intermittent support and uncontrolled air cushions. To be safe to operate, hydroplane boats must be made to ride flat and level across the surface of the water or through the crests of waves rather than bouncing from one wave to the next.

This can be accomplished without loss of efficiency by forward converging diagonal planes and a controlled air cushion that is directly under the center of gravity of the boat where it can lift the boat without causing upsetting moments or unstable oscillations. Forward converging diagonal planes provide support along the entire length of the boat and completely eliminate porpoising in waves up to half the length of the boat. The diagonal planes converge into a sharp pointed bow which penetrates wave crests with a minimum impact, absorbs the impact and distributes it along the entire length of the boat so that the boat rides flat and level through the crests of the waves rather than bouncing from one wave to the next. In a turn, forward converging diagonal planes act in the same manner as the swept back wings of an airplane. The outer plane moves faster and presents a broader face to the line of motion and therefore provides more lift while the inner plane acts conversely and provides less lift. This differential shifting of the lifting forces counteracts the tendency of the boat to flip over and it allows the inner plane to drop below the surface of the water and dig in to prevent the boat from excessive side slipping. This digging-in action can be accentuated by venting the steps of the diagonal planes to allow trapped water to escape. Forward converging diagonal planes, then, can provide stability to hydroplane boats that will make them safe to operate at high speeds in waves up to half the length of the boat.

Forward converging diagonal planes are so spaced at either side of the boat that they can be combined with a transverse plane at the stern of the boat to confine an air cavity directly under the center of gravity of the boat and this air cavity can be pressurized by air scoops in the bow and at the sides of the boat to form an air cushion that will support the boat. The area of this cavity will be such that ½ to 1 pound per square inch of air pressure will support the weight of the boat. A scoop in the bow the size of an automobile radiator will generate this pressure at 50 miles per hour. Since the air cushion is confined by the diagonal and transverse planing surfaces and is directly under the center of gravity of the boat, it will lift the boat and improve its efficiency without causing unstable oscillations in forward motion, but if it is not reguated it can, at higher speeds, hold the boat above the surface of the water and prevent the inner diagonal plane from digging into the water in a turn or side slipping motion. It can be regulated to allow proper differential action of the diagonal planing surfaces by damper vanes in the scoops which can be operated at the proper moment to spoil the air in the scoops and reduces the pressure in the air cushion. The large scoop in the bow will have the added advantage of greatly reducing the frontal area of the boat and therefore its impact with wave crests. It will ingest impacted waves, force them into the cavity under the boat, and convert the impact into useful lift at the center of gravity. On the other hand, the large scoop in the bow will deprive the bow of much of its buoyancy which will affect the behavior of the boat at slow speed and at anchor. This can be corrected by closing the air scoop at its forward end, thereby making a buoyant air chamber of it when the boat is not moving forward at high speed. Forward converging diagonal planes in combination with a transverse after plane, air scoops, and various regulating devices can therefore provide hydroplanes with a controlled air cushion which will support the boat at high speeds and make it more efficient as well as more stable.

Therefore, it is the object of my invention to make hydroplane boats more stable, more efficient, and therefore more useful by providing them with diagonal and transverse planes, a controlled air cushion, and means for regulating the pressure in the air cushion.

It is also the object of my invention to make speed boats stable, efficient, and safe to operate so that they will become a useful means of transportation that is competitive with automobiles.

It is further the object of my invention to provide a suitable conveyance for improved means of boat propulsion that have been invented and are being developed.

These and related objects of my invention will be demonstrated in the following specification in conjunction with the drawings in which:

FIG. 1 is a perspective view of a rammed air cushion hydroplane showing the arrangement of the planes and scoops.

FIG. 2 is a cross sectional elevation showing the configuration of the center scoop and the cavity under the boat.

FIG. 3 and

FIG. 4 are an elevation and a bottom plan showing the function of the side air scoops.

Description

FIG. 1 is a perspective view of the forward end and underside of a rammed air cushion hydroplane with a transverse after planing surface 1 and diagonal planing surfaces 2 and 3 converging forward at the centerline of the hull and surrounding and confining an air cavity 4 under the bottom of the hull. The bow of the hull is provided with a large air scoop 5 which, when the boat is moving forward, forces air through a center duct into air cavity 4 under the bottom of the hull. On either side of air scoop 5 are air scoops 6 and 7 which force air through ducts in the sides of the hull and the diagonal planing surfaces into air cavity 4. The ducts through diagonal planing surface 3 are visible in this view at 8. Air scoop 5 is provided with damper vane 9 which is operated in conjunction with the rudder or independently of it to spoil the air flow in the scoop and reduce the air pressure in the cavity 4. The bow of the hull is also provided with a retractable bowsprit 10 which when extended increases the effective length and the wave penetration capability of the diagonal planing surfaces 2 and 3, and when retracted closes and seals airscoop 5, renders it buoyant, and thereby increases the buoyancy of the bow when the boat is at anchor or moving slowly. The functions of all of these features will be illustrated in subsequent Figures. This configuration can be varied in a number of ways as to the placement of the air scoops and the arrangement of the planing surfaces; as long as the air scoops force air into the cavity under the hull, and the cavity is surrounded and confined by the planing surfaces. A forward transverse planing surface can be added if the center of gravity of the boat has to be further forward. The diagonal planing surfaces can diverge forward rather than converge if there is a forward transverse planing surface, but the configuration shown has some advantages for rough water operation and is simplest for purposes of illustration. The slots at 11 and 12 in the transverse after planing surface 1 are to accomodate articulated waterwheel type propellers. The rotary action of the propellers will prevent air from escaping through these slots and will force additional air into the cavity under the hull. If a screw propeller is used, these slots will not be present.

FIG. 2 is a cross sectional elevation through the centerline of the boat. It shows the hull 13 driven by an engine 14, a differential drive 15, and propellers 16, and steered by a rudder 17. In this case the rudder is forward where it is effective at high speeds. Slow speed steering is accomplished by driving the two articulated waterwheels differentially. If a screw propeller is used, rudder will be aft. The purpose of the figure is to illustrate the action of the center scoop, the center duct, and the cavity. The cavity 4 is confined between the lower edges of diagonal planing surfaces 2 and 3 (3 is not shown in the figure), the face of the transverse planing surface 1, and the surface of the water 18. It is pressurized by air that is accumulated in center scoop 5, as the boat moves forward, and is forced through duct 19 into the cavity 4. Ducts 8 through the diagonal planing surfaces also enter the cavity, but air cannot escape through them because air is being forced to enter through them by the side scoops as will be explained in the subsequent figure. Air can only escape from the cavity by creating enough pressure in the cavity to lift the boat above the surface of the water so that it can escape under the edges of the planing surfaces. When the boat is travelling at high speed, the pressurization of the cavity can exceed the fraction of a pound per square inch required to lift the boat, and the boat will be lifted above the surface of the water so that only the propellers and the rudder are in the water. In this position, the boat can travel forward efficiently, but it may skid when executing a turn. This condition can be obviated by providing vents in the after plane which can be controlled to allow air to escape from the cavity at the proper moment or by providing damper vane 9 in the center scoop 5. Damper vane 9 can be controlled independently of the rudder or in conjunction with it to spoil the air flow in the scoop, or shut it off completely, to reduce the air pressure in the cavity and allow the boat to sink into the water where the diagonal planning surfaces 2 and 3 will act differentially to prevent skidding or sideways motion in a turn. When the boat is at anchor or moving too slowly to be supported by the planing surfaces and the air cushion, the buoyancy of the bow is greatly reduced by the large center scoop and duct. This is corrected by the retractable bowsprit 10 which is pivoted at pivot point 20 and retracted to position 21 by retracting mechanism 22. In retracted position 21 is seals against the lips of air scoop 5 and converts air scoop 5 into a buoyant air chamber which restores all of the buoyancy to the bow. In its extended position bowsprit 10 extends the effective length of planing surfaces 2 and 3 improves the ability of the boat to penetrate wave crests at high speeds. Air scoop 5 also improves the ability of the boat to penetrate wave crests by ingesting water and thereby reducing the impact and converting the impact into lift under the center of gravity of the boat.

FIG. 3 is a side elevation of a rammed air cushion hydroplane hull and FIG. 4 is a bottom plan of the same hydroplane hull. These figures illustrate the manner in which the side air scoops pressurize the air cavity under the hull.

They show hull 13 equipped with transverse planing surface 1 and diagonal planing surfaces 2 and 3 riding on the surface of the water 18 and surrounding air cavity 4 which is pressurized by air scoops 6 and 7, all as shown in previous figures. The sides of the hull and the diagonal planing surfaces are double skinned and air ducts are provided between their inner and outer skins to conduct air from the side scoops down the sides of the hull, through the diagonal planing surfaces, and into the air cavity under the hull. The double skinned sides and planing surfaces have the added function of protecting the boat from being punctured by foreign objects in the water. The side scoops are large enough to accumulate air from the forward motion of the boat, pressurize it, and force it through the ducts into the cavity under the boat. Left side scoop 7 accumulates air and forces it down side ducts 25, through bottom ducts 8, and into the cavity 4. At the same time right side scoop 6 accumulates air and forces it down side ducts 23, through bottom ducts 24, and into the cavity. Forcing air into the cavity from both sides at the same time it is being forced in from the center scoop as described in FIG. 2, not only increases the air pressure in the cavity, but also has the effect of forcing all of the air toward the stern of the boat and preventing air from escaping at the forward end of the cavity before it has pressurized the after end of the cavity. This offsets the natural tendency of the boat to rise at the bow, enables it to get up on its planing surfaces more quickly, and helps it to ride flat and level on its air cushion. When the air cushion is regulated by damper vanes or by allowing air to escape at the after plane as described in FIG. 2, and the boat begins to execute a change of course or a turn and begins to side slip, the diagonal planing surface at the inside of the turn presents a negative angle to the motion of the boat, loses lift, and drags in the water, while the outside diagonal planing surface presents a positive angle to the motion of the boat, continues to lift, and remains on the surface of the water. This differential action is enhanced by the ducts in the diagonal planing surfaces and the sides of the boat. The ducts at the inside of the turn fill with water and allow it to escape through the scoop at that side. This enables the inside diagonal planing surface to dig in and prevent the boat from upsetting while the side ducts at the outside are still forcing into the air cavity and contributing to the lift at the outside of the turn to further counteract the upsetting forces. Damper vanes can be used in the side scoops as well as in the center scoop and for the same purpose, but they must be arranged so they do not restrict the escape of water through the ducts and scoop at the inside of a turn.

Having thus described the several aspects of my invention, I claim:

1. In a hydroplane boat, the combination of a buoyant hull provided with means of propelling and guiding the same, diagonal and transverse planing surfaces so disposed beneath said hull that they lift the hull above the surface of the water and at their lower extremities surround, confine, and fix the location of an air cavity beneath the center of gravity of the boat, and an air scoop in the bow of said hull which gathers air from the forward motion of the boat, forces it through a duct into said air cavity and pressurizes said air cavity, and which hull is equipped with a retractable bowsprit, said bowsprit being an extension of said diagonal planing surfaces which improves their ability to penetrate wave crests when extended, and which bowsprit seals and closes said air scoop when retracted to render said air scoop buoyant when the boat is not moving at high speed.

2. In a hydroplane boat, the combination of a buoyant hull provided with means of propelling and guiding the same, diagonal and transverse planing surfaces so disposed beneath said hull that they lift the hull above the surface of the water and at their lower extremities surround, confine, and fix the location of an air cavity beneath the center of gravity of the boat, and air scoops at the sides of said hull which gather air from the forward motion of the boat, force it through ducts down the sides of the hull and ducts through the diagonal planing surfaces beneath said hull into said air cavity and pressurize an air cushion in said air cavity which provides support to the boat, and which ducts through the diagonal planing surfaces beneath the hull are slanted in such a manner that the flow of air is directed inward and toward the after end of the air cavity so that air is prevented from escaping at the forward end of the air cavity.

3. In a hydroplane boat as set forth in claim 2, wherein said air scoops are equipped with damper vanes controlled by appropriate mechanisms to interrupt the flow of air and regulate the air pressure at either side of the air cavity to accommodate the various movements of the boat in and on the water.

4. In a hydroplane boat, the combination of a buoyant hull provided with means of propelling and guiding the same, diagonal and transverse planing surfaces so disposed beneath said hull that they lift the hull above the surface of the water and at their lower extremities surround, confine, and fix the location of an air cavity beneath the center of gravity of the boat and air scoops at the sides of the hull which gather air from the forward motion of the boat, force it through ducts into the sides of said air cavity in such a manner that it prevents air from escaping at the forward end of the air cavity and pressurizes the air cavity to provide support to the boat, and which air ducts fill with water at one side of the hull and enhance the differential action of the diagonal planing surfaces by allowing water to escape through the scoop on that side when said diagonal planing surfaces are acting differentially in a side slipping manoeuver.

* * * * *